UNITED STATES PATENT OFFICE 2,653,156

QUATERNARY AMMONIUM COMPOUNDS AND PROCESS FOR PRODUCING THE SAME

Martin Karl Deutsch, Hamburg, and Hans Werner Stobbe, Hamburg-Volksdorf, Germany, assignors to Lehn & Fink Products Corporation, a corporation of Delaware No Drawing. Application June 3, 1950, Serial No. 166,072. In Germany June 21, 1949

13 Claims. (Cl. 260—404)

The present invention relates to improvements in organic quaternary ammonium compounds and method of preparing the same, and more particularly to such compounds having detergent and bactericidal properties.

It has hitherto been proposed that higher molecular fatty acids or their derivatives be caused to react with aliphatic amines having four substituting alkyl groups into at least one of which a hydroxyl group has been introduced for esterification with the higher molecular acids. The compounds obtained in this way have a soap-like character and are of technical importance in particular as detergents, foaming agents, dispersing and emulsifying agents. Furthermore it is known that the valuable detergent properties of the previously mentioned bodies are found to an enhanced degree in compounds in which the above-described grouping contains an aralkyl instead of an alkyl substituent.

It has now been found that compounds which contain an aralkyl radical and a hydroxy-alkyl radical esterified with a higher fatty acid and in addition an unesterified hydroxy-alkyl radical as substituents on the quaternary nitrogen, are highly bactericidal substances which are particularly suitable for use as disinfectants.

The compounds prepared in accordance with the present invention are characterized by the following general formula:

$$\left[ \begin{array}{c} R_1 \\ | \\ R_2-N-R_3 \\ | \\ R_4 \end{array} \right]_n X$$

In this formula:

$R_1$ is a low molecular hydroxy-alkyl radical.
$R_2$ is an acylated hydroxy-alkyl radical with an acyl-substituent having from 6 to 18 carbon atoms.
$R_3$ is an aralkyl radical.
$R_4$ is a low molecular aliphatic alkyl or cyclo-alkyl radical which may contain a double bond and may or may not include oxygen, sulfur or nitrogen;
X is a suitable acid radical, and
$n$ is an integer corresponding to the valence of X.

The radical $R_1$ may suitably have from 1 to 5 carbon atoms.

The production of the new compounds may be effected in a manner generally known, in that a tertiary amine containing the group

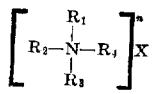

may be formed preliminarily and made quaternary by means of the ester $R_4$—X; or a tertiary amine containing the group

may be formed preliminarily and converted into the quaternary form by means of the ester $R_3X$. Esters of this character suitable for the reaction are advantageously the hydrogen halide and neutral sulfuric acid esters of the alcohols derived from the radicals $R_3$ and $R_4$.

The production of the aforesaid tertiary amines, which are characterized by containing a hydroxy-alkyl residue acylated with a higher molecular acid and an unesterified hydroxy-alkyl residue, may be suitably effected by the stepwise building up of the high molecular radical, as by reacting with a higher molecular fatty acid on amines which, in addition to an aliphatic radical $R_3$ or $R_4$ bonded to nitrogen also have two hydroxy-alkyl residues provided with replaceable hydroxy groups to effect substitution of one hydroxyl group with an acyl group. For example, we may proceed by heating such an amine in admixture with fatty acid to 80 to 250° C. and distilling off the water of condensation. The esterification reaction may be accelerated if inert gas is introduced into the reaction mixture or by applying vacuum and/or by vigorous agitation in order to provide for a more rapid removal of the water of condensation. One can also add solvents to the reaction mixture, with the help of which the water of condensation may be azeotropically distilled. As such solvents, for example, such organic compounds are suitable as form azeotropic mixtures with water in the temperature range from 80 to 250°. In accordance with a preferred method of carrying out the invention, carbon dioxide is introduced into the reaction mixture, whereby the time required for the reaction is materially reduced, and also because the oxygen of the air is eliminated, darkening of the reaction products is avoided.

The compounds obtained are light colored oils. They have the known properties of the higher molecular tertiary amines, and are thus readily soluble in dilute acids, as, for example, formic, acetic and lactic acids, phosphoric acid, hydrochloric acid and the like. These solutions foam and have bactericidal action.

In order to produce the amines suitable as the starting material for the stepwise synthesis of the aforesaid higher molecular nitrogen compounds, which amines contain, in addition to the radical R₃ or R₄ bonded to nitrogen, two hydroxy-alkyl residues bonded to the nitrogen, secondary dialkylol amines may be substituted at the nitrogen by the radicals R₃ or R₄. For this purpose, for example, aralkyl halides may be caused to react with dialkylol amines in the presence of hydrogen halide bonding agents. Also good yields of tertiary dialkylol amines alkylated at the nitrogen atom may be obtained by the action of organic acids used as reducing agents on hydroxy-alkyl-oxazolidin-compounds. For this purpose, equivalent amounts of hydroxy-alkyl-oxazolidin-compounds and of the reducing acid may be caused to react upon each other in the cold and the reaction is completed by heating on a water bath. Oxalic and formic acid have been found to be particularly suitable acids for this purpose.

The hydrogen halide esters of aliphatic alkyl or cycloalkyl alcohols, which may optionally have one or more double bonds and/or be interrupted by oxygen, sulfur or nitrogen, may be caused to react on secondary dialkylol amines in the presence of a suitable acid acceptor, and thereby obtain the corresponding amine substituted at the nitrogen.

Another method suitable for producing the above described intermediate products consists in that ethylene oxide be caused to react on primary amines which contain either an aliphatic radical, designated in the above general formula by R₄, bonded at the nitrogen, or which contain an aralkyl radical bonded through the aliphatic portion of the radical to nitrogen. In this way in both cases two hydroxy-alkyl residues are introduced into the primary amino group.

Having obtained by one of the above described procedures higher molecular tertiary amines which are characterized by their content of a hydroxy-alkyl residue and an acylated hydroxy-alkyl residue, these are converted in known manner into the corresponding quaternary ammonium compounds by the reactive esters R₃—X or R₄—X. For this purpose, a mixture of the components are caused to act upon each other for a fairly long time in the cold or at elevated temperature, either with the addition or exclusion of solvents. The compounds obtained form viscous, syrupy masses and are distinguished by great solubility in water and most organic solvents. They show good detergent properties, whereby penetration into textiles or spreading on soiled or spotted surfaces is promoted to an extraordinary degree.

The compounds in accordance with the present invention are remarkably well suited for application as disinfecting agents by reason of their preeminent bactericidal properties. They may be used either alone or in admixture with other disinfecting agents, if desired with the addition of diluting and extending agents and/or corrosion inhibiting and odor improving substances, as disinfectants for articles of household use, surgical instruments, walls, floors, textiles, wools, carpets, equipment used in the food industries, etc.

Preparations containing the aforesaid compounds present a valuable novel feature in the field of surgical hand disinfection. While as is known, in surgical hand disinfection hitherto, baths were prepared for use by adding to the washing liquid from 1-2% of a preparation containing 10 to 20% of quaternary ammonium compounds, the products made according to the present invention can be directly applied to the human skin without dilution and used for washing without any injury to the skin. Thereby the use of any washing vessels is made unnecessary. The time necessary for disinfection is shortened because of the concentrated form in which the preparation is applied. Furthermore, the concentrated solution of the quaternary ammonium compound has an extraordinary cleansing action on the skin in the presence of little water, whereby the value of the disinfecting medium is greatly increased.

In their manifold applicability as disinfectants and washing agents the new compounds of the present invention are superior to other known products.

*Example 1*

Benzyldiethanolamine of boiling point $K_{p8}=$ 189–191° C. is prepared by the action of 1 mol benzyl chloride or other benzyl halide, such as benzyl bromide or iodide, on 1 mol diethanolamine (M. P.=27°) in the presence of potassium carbonate and subsequent distillation and vacuum. 102.4 parts of the benzyldiethanolamine thus prepared is mixed with 72.1 parts n-caprylic acid in a glass flask. The mixture is heated with rapid agitation at ordinary pressure at first to 160° C. and the temperature is raised in the course of several hours to 200° C. at the end. The condensation water which slowly distills off is collected in a graduated receiver and the heating is ended as soon as 9 g. condensation water has passed over, which is the case after about 4½ hours.

In carrying out the experiment as above described, the titration control conducted after cooling gives an acid number of a value <5, which indicates that the conversion has been almost quantitative. The benzyldiethanolamine-monocaprylic acid ester formed is a reddish colored oil, which is readily soluble in diluted formic, acetic and lactic acids and gives foaming solutions which are bactericidal.

125 parts by weight of the ester thus obtained is mixed with 50 parts by weight dimethyl-sulfate and heated mildly for an hour on a water bath, a methyl group being thereby introduced at the N atom and the sulfate of the resulting quaternary compound is formed and is identified as methyl hydroxyethyl benzyl caprylethoxy methylsulfate. 175 parts by weight of the resulting compound is formed. It is a bright reddish brown colored thick oil, which dissolves to form a clear solution in water and gives a strongly foaming solution. The quaternary salt is soluble in almost all organic solvents, except ether.

It is readily apparent, in carrying out the above reaction, the dimethyl sulfate used for the introduction of the alkyl group may be replaced by equivalent amounts of other dialkyl sulfates, such as diethyl sulfate, dipropyl sulfate or the like. Instead of the alkyl sulfates, alkyl halides, phosphates or alkyl esters of other inorganic acids may be used for this purpose. The corresponding cycloalkyl esters, such as the cyclobutyl, cyclopentyl and cyclohexyl esters may likewise be employed to introduce the corresponding cycloalkyl group into the compound.

Instead of diethanolamine other dialkylolamines such as dipropylolamine may be used and the aralkyl group introduced may be the ethyl benzene, propyl benzene, isopropyl benzene, toluene, cymene or the like.

The caprylic acid referred to in the foregoing example may be replaced by equivalent amounts of other fatty acids having from 6 to 18 carbon atoms, such as dodecanoic acid, caproic acid, palmitic acid, stearic acid, oleic acid, myristoleic acid, sorbic acid, linoleic acid or the like, or mixtures of such fatty acids as derived from animal and vegetable fats and oils. Thus, by substituting for the caprylic acid in the above example an equivalent amount of dodecanoic acid and using methyl chloride in the final methylation step, the quaternary compound methyl hydroxy-ethyl benzyl dodecanoylethoxy ammonium chloride is obtained. This compound is similar in its physical properties, solubilities and detergent properties to the compound produced in the example. A 15% solution in water is found suitable for use as a concentrated detergent and bactericidal medium. An 0.5% solution of this concentrate is germicidal for dense cultures of Staph. aureus and E. coli in one minute.

In Example 1, the potassium carbonate present in the initial step of the reaction serves as an acid acceptor and may be replaced by any suitable alkaline material capable of combining with the chlorine of the benzyl chloride; for example alkali metal carbonates or bicarbonates such as sodium carbonate or bicarbonate, triethanolamine, or pyridine.

*Example 2*

205 parts benzyldiethanolamine ($K_{p8}$=189–193° C.), obtained as described in Example 1 or by reaction of benzyl chloride with a technical mixture of about 60% di- and 40% tri-ethanolamine and subsequent distillation under a vacuum of about 8 mm. Hg, is thoroughly agitated with 200.3 parts by weight of lauric acid and heated to 160° C. in an ordinary distillation apparatus while introducing a stream of hydrogen. When the condensation water has for the most part passed over, the temperature rises to 200° C. After about 3 hours, the theoretical amount of approximately 18 g. condensation water has passed over. At this point the reaction is broken off and the material allowed to cool. The acid number of the reaction mixture has dropped from its initial value of 139.5 to 3.6.

The resulting benzyldiethanolamine - monolauric acid ester is a bright yellow colored oil. It dissolves rapidly in diluted formic, acetic, lactic and phosphoric acids to form strongly foaming solutions, which are highly bactericidal.

35 parts by weight of the ester thus obtained are mixed with 12 parts by weight of dimethylsulfate and 20 parts dry ether, and allowed to stand overnight at about 30° C. The quaternary salt, which may be designated the sulfate of methyl benzyldiethanolamine monolauric acid ester, is obtained in quantitative yield, and forms a reddish brown syrup, which forms a clear solution in water.

In a corresponding way there is obtained from 16 parts by weight of dimethylsulfate by heating for 1 hour with 50 parts of a benzyldiethanolamino ester mixture, consisting of the benzyldiethanolamine-mono-fatty acid esters of the fatty acids present in coconut oil of a chain length of $C_6$–$C_{14}$, a syrupy quaternary body, which is like the above compound and that obtained under Example 1.

In this example also, as set forth in connection with Example 1, other alkyl sulfates or alkyl esters of other inorganic acids may be employed instead of the dimethyl sulfate and other fatty acids may replace the lauric acid used in Example 2. Instead of benzyldiethanolamine, other aralkyl dialkylolamines may be employed, as indicated above in connection with Example 1.

*Example 3*

119 parts by weight of hydroxyethyloxazolidin having a boiling point at 10 mm. pressure of 112° C. is gradually mixed with 55 parts of 85% formic acid. Before each addition after the first, the vigorous foaming produced by carbon dioxide evolution is allowed to subside. To complete the conversion, the mixture is heated for about 2 hours on the water bath and the dark colored reaction product is then subjected to vacuum distillation. Methyldiethanolamine is produced and passes over at 131° C. under 10 mm. pressure as a colorless to slightly yellowish oil. The yield amounts to 92% of theoretical, based on the hydroxyethyloxazolidin.

62.5 parts by weight of the methyldiethanolamine are mixed in a glass flask with 100 parts by weight of a coconut oil fatty acid fraction having an acid number of 280, whereupon energetic heating is observed. Finally the reaction mixture is heated under a reflux cooler with introduction of a carbon dioxide stream at first to 160° C., and toward the end of the reaction to 200° C. The condensation water distilling off is collected in a graduated receiver. After about 1 hour, the theoretical amount of condensation water (9 g.) has passed over. The contents of the flask are then cooled. Determination of the acid number shows that it has dropped to about 11 at the end of the reaction. The esterification with the introduction of carbon dioxide permits, as compared with the reaction of Example 1, a saving of time of 3½ hours, and in comparison with Example 2, of 2½ hours.

The methyldiethanolamine - mono - esters of fatty acids of chain length $C_6$–$C_{14}$ which is thus obtained is a thinly fluid, bright yellow oil, which dissolves readily in dilute formic, acetic, lactic, hydrochloric and phosphoric acids to form foaming solutions. Such solutions are bactericidal.

The ester mixture can be subjected to the process of forming a quaternary compound without further treatment. On distillation in a high vacuum of 0.4 mm. it goes over at 155–185° C.

150 parts by weight of the unrefined ester mixture is mixed with 60 parts by weight benzylchloride and heated for about 3 hours at 120°. Thereupon the reaction mixture is cooled, whereby a thick, yellowish red syrup consisting essentially of benzyl methyldiethanolamine monoesters of fatty acids having 6 to 14 carbon atoms is obtained. After suitable purification, it mixes in every proportion with water and gives stable, aqueous dilutions in ratios to 1:5 and 1:10. Such solutions emulsify bactericidal phenols, such as, for example, p-chloro-m-cresol. It may be mixed with corrosion preventing agents. Such preparations may be brought to a pH between about 4 and 8 by means of acids or alkalies.

*Example 4*

130 parts by weight of methyldiethanolamine ($K_{p10}$=131 C.) obtained according to the method described in Example 3, are mixed with 160 parts by weight of a coconut oil fatty acid fraction of a mean molecular weight of 160 (acid number 350) and 50 parts of toluol. The mixture is finally placed in a distillation apparatus with a water separator and in the course of 6 hours the water of condensation formed by the esterification is distilled off azeotropically. After the termination of the water separation, the remainder of the solvent is removed under vacuum and the example then proceeds as under Example 3. As suitable solvents, besides toluol, the following may be used: benzol, xylol, carbon tetrachloride, as well as all those organic compounds which form azeotropic mixtures with water in the temperature range from 80 to 250° C. and which do not react with the amine and fatty acid which take part in the reaction.

We claim:

1. A disinfectant composition containing as an essential ingredient a quaternary ammonium compound of the general formula

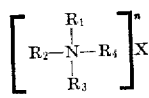

wherein $R_1$ is a lower molecular hydroxyalkyl radical, $R_2$ an acylated hydroxyalkyl radical with the acyl substituent having 6 to 18 carbon atoms, $R_3$ an aralkyl radical and $R_4$ represents a radical of the group consisting of the lower molecular alkyl, alkylene and cycloalkyl radicals, X is an inorganic acid radical and $n$ is an integer corresponding to the valence of X.

2. The process of producing quaternary ammonium compounds wherein a hydroxy-alkyl-oxazolidin compound is reduced to a dialkylol amine, the resulting dialkylol amine is heated with a fatty acid having 6 to 18 carbon atoms to effect acylation therewith of one hydroxyl group of said dialkylol amine, and the product heated with an inorganic ester of the group consisting of the inorganic aralkyl esters and the inorganic alkyl esters to form a quaternary compound.

3. In the process of producing quaternary ammonium compounds, reacting with hydrogen halide esters of alcohols of the class consisting of the low molecular alkyl and cycloalkyl alcohols on secondary dialkylol amines in the presence of acid acceptors of the class consisting of acid carbonates, neutral carbonates, tertiary amines and pyridine, reacting the resulting amine with a fatty acid having 6 to 18 carbon atoms, thereby acylating an alkylol radical substituted at the nitrogen of the amine, and reacting the resulting compound with an inorganic ester of an alcohol consisting of the low molecular alkyl, alkylene and cycloalkyl radicals.

4. The process for the production of quaternary ammonium compounds wherein tertiary amines which contain, bonded to the nitrogen, a hydroxyalkyl radical, a hydroxyalkyl radical esterified with a higher molecular fatty acid and a radical of the group consisting of the alkyl and alkylene radicals, the aralkyl and cycloalkyl radicals are heated with an inorganic ester of an alcohol of the group consisting of the alkyl and alkylene alcohols, the aralkyl and cycloalkyl alcohols, thereby forming a quaternary ammonium compound.

5. The process of producing quaternary ammonium compounds comprising the steps of reacting a tertiary amine having the formula

wherein $R_1$ and $R_2$ are lower molecular hydroxyalkyl radicals and $R_3$ is a radical of the group consisting of the aralkyl, low molecular alkyl, alkylene and cycloalkyl radicals with a fatty acid having 6 to 18 carbon atoms to effect acylation of one of said radicals $R_1$ and $R_2$, and reacting the resulting acylated tertiary amine with an inorganic ester of the group consisting of the inorganic alkyl esters and inorganic aralkyl esters, thereby forming a quaternary compound.

6. The process of producing a quaternary ammonium compound which comprises the steps of reacting benzyl diethanolamine with a fatty acid having 6 to 18 carbon atoms to effect acylation of one of the hydroxyl groups thereof, and reacting the resulting compound with an alkyl ester of an inorganic acid, thereby forming a quaternary compound.

7. The process of producing a quaternary ammonium compound comprising the steps of reacting methyldiethanolamine with a fatty acid having 6 to 18 carbon atoms to effect acylation of one hydroxyl group thereof, and reacting the resulting monoester with an alkyl ester of an inorganic acid, thereby forming a quaternary compound.

8. A quaternary ammonium compound having detergent and germicidal properties and having the formula

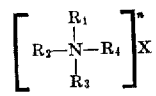

wherein $R_1$ is a low molecular hydroxyalkyl radical,
$R_2$ is an hydroxyalkyl radical acylated with a fatty acid having 6 to 18 carbon atoms,
$R_3$ is an aralkyl radical,
$R_4$ is a radical of the group consisting of the low molecular alkyl, alkylene and cycloalkyl radicals,
X is an inorganic acid radical, and
$n$ is an integer corresponding to the valence of X.

9. A quaternary ammonium compound having detergent and germicidal properties and having the formula

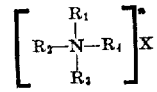

wherein $R_1$ is an hydroxyalkyl radical having 1 to 5 carbon atoms,
$R_2$ is a hydroxyalkyl radical acylated with a fatty acid having 6 to 18 carbon atoms,
$R_3$ is an aralkyl radical having from 7 to 10 carbon atoms,
$R_4$ is an alkyl radical having 1 to 3 carbon atoms,
X is an inorganic acid radical, and
$n$ is an integer corresponding to the valence of X.

10. The quaternary ammonium compound, methyl hydroxyethyl benzyl caprylethoxy ammonium salt of an inorganic acid.

11. The compound of claim 10 wherein the quaternary ammonium salt is a chloride.

12. The quaternary ammonium compound, methyl hydroxyethyl benzyl dodecanoylethoxy ammonium chloride.

13. The quaternary ammonium compound mixture consisting essentially of the chlorides of benzyl methyl diethanolamine monoesters of fatty acids having 6 to 14 carbon atoms.

MARTIN KARL DEUTSCH.
HANS WERNER STOBBE.

References Cited in the file of this patent

UNITED STATES PATENTS

| Number | Name | Date |
|---|---|---|
| 2,371,429 | De Groote et al. | Mar. 13, 1945 |
| 2,519,924 | Nowak | Aug. 22, 1950 |

FOREIGN PATENTS

| Number | Country | Date |
|---|---|---|
| 538,718 | Great Britain | Aug. 14, 1941 |

Certificate of Correction

Patent No. 2,653,156      September 22, 1953

MARTIN KARL DEUTSCH ET AL.

It is hereby certified that error appears in the printed specification of the above numbered patent requiring correction as follows:

Column 7, claim 5, the structural formula should appear as shown below instead of as in the patent $$R_2-\underset{R_3}{\overset{R_1}{N}}$$

and that the said Letters Patent should be read as corrected above, so that the same may conform to the record of the case in the Patent Office.

Signed and sealed this 3rd day of November, A. D. 1953.

[SEAL]

ARTHUR W. CROCKER,
*Assistant Commissioner of Patents.*